United States Patent [19]

Mitchell

[11] Patent Number: 4,572,322

[45] Date of Patent: Feb. 25, 1986

[54] FINDING DISTANCE TO BLOWOUT USING WELLBORE ACOUSTIC MEASUREMENTS

[75] Inventor: Forrest R. Mitchell, Houston, Tex.

[73] Assignee: Shell Oil Company, Houston, Tex.

[21] Appl. No.: 506,962

[22] Filed: Jun. 23, 1983

[51] Int. Cl.⁴ .............................................. G01V 1/40
[52] U.S. Cl. .................................... 181/105; 340/853; 367/35; 367/118; 367/911
[58] Field of Search ................... 181/102, 105; 367/25, 367/28, 29, 30, 35, 118, 911; 340/853, 860; 364/422; 73/151, 599; 166/241, 250, 254, 255; 175/40, 50

[56] References Cited

U.S. PATENT DOCUMENTS

| | | | |
|---|---|---|---|
| 3,282,355 | 11/1966 | Henderson | 175/40 X |
| 3,725,777 | 4/1973 | Robinson et al. | 324/8 |
| 3,748,574 | 7/1973 | Mitchell et al. | 324/323 |
| 4,114,721 | 9/1978 | Glenn, Jr. | 181/102 X |
| 4,214,226 | 7/1980 | Narasimhan et al. | 181/102 X |
| 4,353,122 | 10/1982 | Cubberly, Jr. | 367/25 |
| 4,458,767 | 7/1984 | Hoehn, Jr. | 166/255 X |

Primary Examiner—David H. Brown
Assistant Examiner—John E. Griffiths

[57] ABSTRACT

A method for finding the distance between a blowout well and a relief well. The method comprises measuring the acoustic noise in the relief well at two or more locations and then calculating the distance to the blowout well.

9 Claims, 5 Drawing Figures

FINDING DISTANCE TO BLOWOUT USING WELLBORE ACOUSTIC MEASUREMENTS

BACKGROUND OF THE INVENTION

The present invention relates to a method for determining the distance between a relief well and a blowout well. The invention is also useful in determining which formation is producing in a blowout well that contains multiple producing formations. During the drilling of wells for the production of hydrocarbons, at times conditions arise which cause either an imbalance of mud weight or loss of drilling mud or borehole fluid in the borehole and results in the well running wild or blowing out. The pressure of the borehole fluid column in the borehole can become underbalanced with respect to a formation by using too light a borehole fluid. Loss circulation occurs when the mud weight is too high and hydraulically fractures a formation which allows the mud to flow into the formation, making it impossible to keep the wellbore full of borehole fluid. Of course, it is the normal drilling practice to maintain the weight of the borehole fluid so that the pressure produced by the column of borehole fluid in the well will exceed the pressure of any formation penetrated by the well.

Blowouts can also occur during remedial workovers of producing wells. During a workover, it is conventional to fill the borehole with drilling mud or borehole fluid having a weight sufficient to hold back formation pressure. Remedial actions can be carried out to improve the well performance or replace tubing strings or other production equipment in the well. During these remedial operations, at times the borehole fluid in the well is lost or for other reasons it is not sufficient to contain the formation pressure. The formation fluids then displace the borehole fluid and the well runs wild.

In many blowouts, the wellhead equipment is destroyed and/or the well catches fire. Since the wellhead equipment is destroyed in such cases, it is impossible to contain the blowout well by closing valves or blowout preventors at the surface and other methods must be utilized. The most common practice in controlling such a blowout well is to drill a relief well which intercepts the formation which is feeding the blowout well. After the interception is effected, heavy fluids and/or cement is pumped down the relief well to kill the formation. While the method is well understood, the ability to accurately guide a relief well so that it intercepts the formation sufficiently close to the blowout well to permit killing the formation is at times difficult. Also, in the case of extremely deep wells, for example 20,000 feet, it has been the practice to attempt an interception of the blowout well at an intermediate depth and pump the heavy cement down the blowout well to stem flow from the formation. Regardless of the type of relief well being drilled, one must know the position of the relief well and the distance between the relief well and the blowout well in order to effect the closing between wells or interception, as the case may be.

In the past various magnetic and electrical methods have been utilized to locate a blowout well with respect to a relief well. For example, U.S. Pat. No. 3,725,777 describes a method using magnetic measurements to locate the blowout well when the blowout has been cased with casing having a remnant magnetism. This method has been further extended now to locate any cased well from an open relief well and has proven satisfactory in many relief well applications. The method does require casing or other tubulars to be present and information regarding the magnetic characteristics of the formation and the casing or other tubulars in the blowout well. Another method for determining the distance between a relief well and a blowout well is described in U.S. Pat. No. 3,748,574. This patent utilizes resistivity measurements made in the open well using an electrical logging device having extremely long electrode spacings. While the method has been used satisfactorily, it does require some knowledge of the resistivities of the formations between the relief and the blowout wells. This information at times can be obtained from conventional resistivity logs run in the relief well.

SUMMARY OF THE INVENTION

The present invention describes a method utilizing acoustic or "noise" measurements made in the relief well to determine the distance between the relief well and the blowout well and certain other items of interest, providing an observable signal of sufficient strength exists. When a well blows out the flow of hydrocarbons produces an acoustic disturbance or noise in the well. The noise is produced either at the formation which is feeding fluids into the well or at times by restrictions which are located in the well. Also, if an underground blowout is occurring an acoustic disturbance will be created at the level where injection back into a formation is occurring. For example, in the case of a producing well, storm chokes or other devices may be placed in the downhole tubulars and thus form a restriction that produces noise.

The method comprises measuring the noise in the relief well at various frequency windows and plotting the measured amplitude of the acoustic energy with respect to the depth of the measurement. In plotting the measured amplitude of the noise, the background noise or "line source" energy can be approximated by making measurements in those portions of the relief well which are separated by greater distances from "point source" in the blowout well. It is probably more appropriate to make this separation between point and line source amplitudes in the power domain which merely involves squaring the observed amplitudes before making the subtraction. By plotting the amplitude derived from point source energy versus depth, one can then obtain the location of the maximum amplitude and from this and the shape of the anomaly calculate the distance between the two wells. Calculations can be carried out using conventional equations that represent the amplitude of noise which would be observed a known distance from a point noise source. The information required in the calculation can be readily obtained from measurements made in the relief well or from other known data.

In the case of a well producing from multiple formations the method can easily determine whether all of the formations are feeding the blowout well or only some of the formations, providing the distances are not too great. Noise measurements made in the relief well will be relatively low amplitude if the formations are not producing, while if they are producing, the noise levels will be much higher. This information will be of great value to those attempting to kill formations feeding a blowout well since only the producing formations will require control.

BRIEF DESCRIPTION OF THE DRAWINGS

The present invention will be more easily understood from the following description when taken in conjunction with the attached drawings.

DESCRIPTION OF THE PREFERRED EMBODIMENTS

Figure 1:
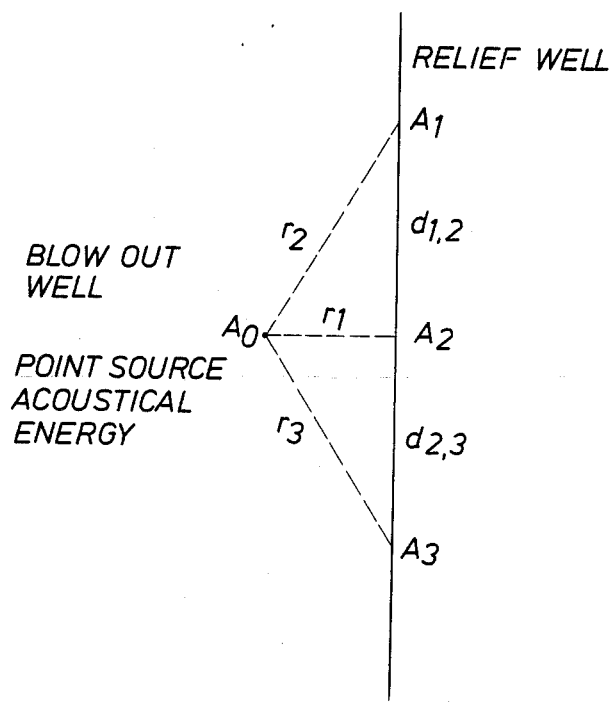
FIG. 1 represents the location of the measurements in the relief well with respect to the blowout well.

As explained above, the present invention relies on acoustic amplitude or "noise" measurements made in a relief well to determine the distance between the relief well and the blowout well. The invention uses known expressions relating the amplitude of acoustic energy observable at any distance from a point source of acoustic energy to the amplitude of the source itself. Referring to FIG. 1, there is shown a relief well passing close to a blowout well containing a point source of acoustic energy $A_o$. The relief well is normally drilled to intercept the blowout well at an angle of less than 10 degrees. As shown, one assumes that at least two measurements (but more as desired for redundancy) were made in the relief well at the locations $A_1$, $A_2$ and $A_3$. From the diagram it is assumed on the basis of maximum amplitudes observed that the location $A_2$ in the relief well is nearest to the acoustic source in the blowout well. The distance between the various locations and the acoustic source in the blowout well are represented by D and R respectively. It can be shown that the amplitude of acoustic energy at any location is related to the amplitude of the source by the following expressions:

$$A_1 = \frac{A_o}{r_2} e^{-\alpha f r_2/V} \quad (1)$$

$$A_2 = \frac{A_o}{r_1} e^{-\alpha f r_1/V} \quad (2)$$

$$r_1 = (r_2^2 - d_{1,2}^2)^{\frac{1}{2}} \quad (3)$$

where $r_1$ and $r_2$ = distance source to measurement points, $r_1$ being the near point distance, i.e., point of maximum amplitude $A_1$ and $A_2$ = measured acoustic amplitude at distances $r_1$ and $r_2$ $\alpha$ = absorption term in db/hz/sec $f$ = frequency $V$ = acoustic velocity of formation Values for the absorption term $\alpha$ and acoustic velocity can be estimated from previous measurements, such as conventional lags. Also, conventional logs such as acoustic and electrical can be run in the relief well to supply measurements for making the estimates.

Figure 2:
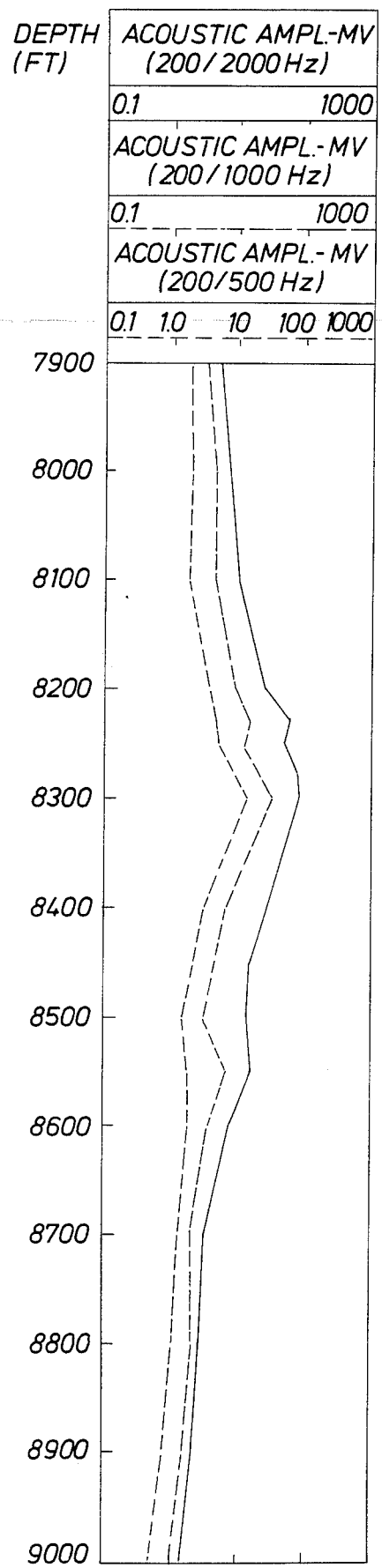
FIG. 2 represents actual measurements made in a relief well.

Referring to FIG. 2 there is shown amplitude measurements made in an actual well at three different frequency bands. Also seen in FIG. 2, the background acoustic energy or line source energy in the borehole can be reasonably determined by using the amplitude measurements in the area 7900 to 8100 feet and from 8700 to 8800 feet. When solving the above expression for the amplitude of the source or distance in turn, one should re-plot the data shown in FIG. 2 after elimination of the background or line source energy from the amplitude signals. The data in FIG. 2 is in millivolts for the amplitude signal since this is the unit utilized in the commercially available logging tool.

Figure 3:
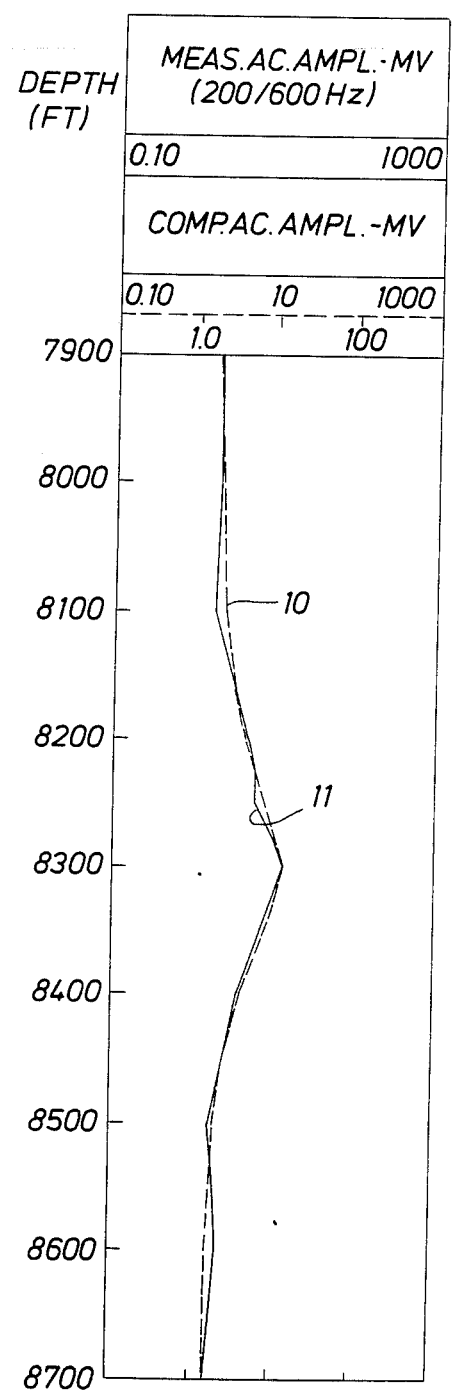
FIGS. 3-5 represent various calculated responses in the relief well in relation to actual measurements made in a relief well.

Shown in FIG. 3 is a curve 10 of the calculated amplitude of the acoustic energy at various locations in the well using the above methodology and a curve 11 of the actual measurements of the amplitude for the frequency band width indicated. As seen the two curves agree very closely and establish that noise amplitude measurements can be utilized in estimating the distance between a relief well and a blowout well. The data in FIG. 3 is for the location of the storm choke at 8500 feet in the blowout well which was assumed to be a point source.

Figure 4:
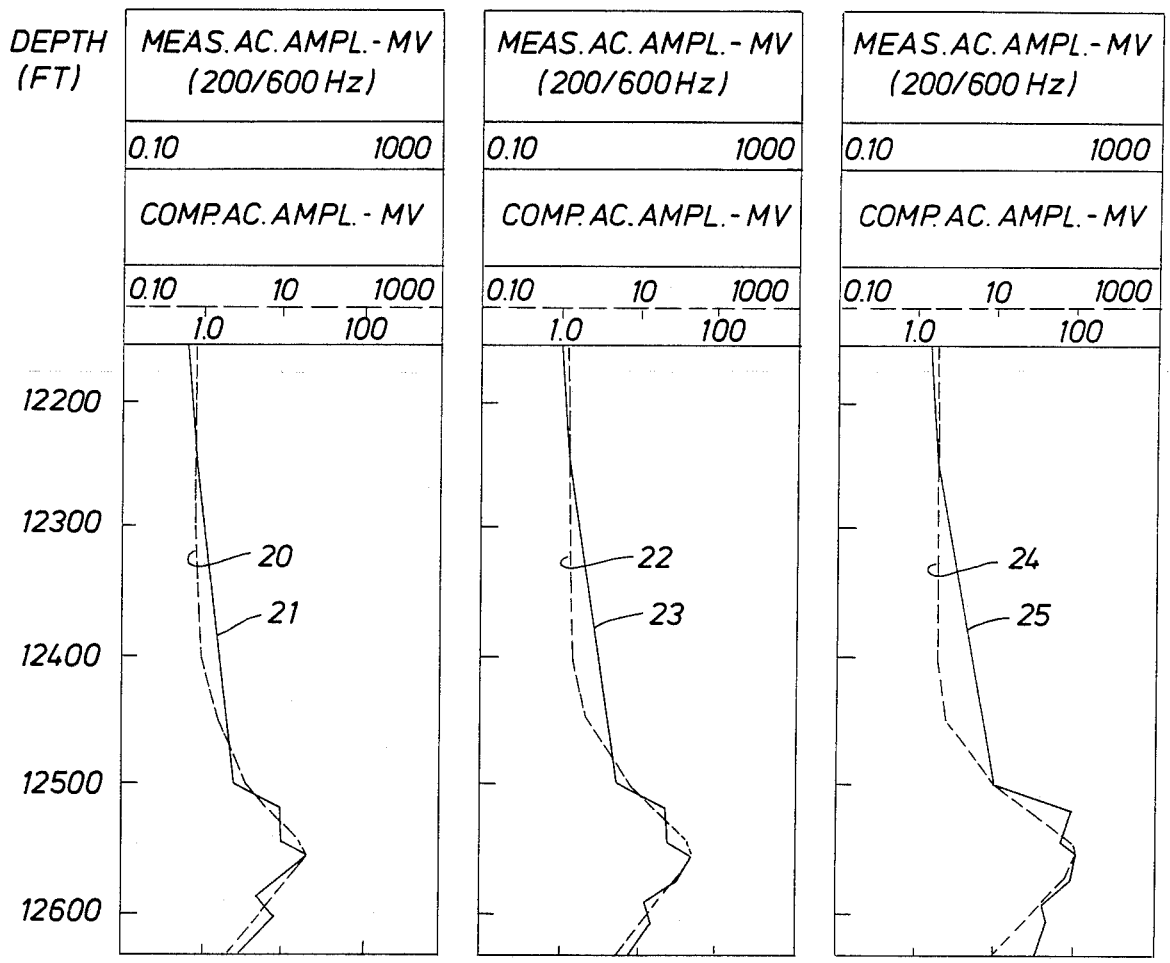

Referring to FIG. 4, there is shown three plots similar to the data shown in FIG. 3 for the producing interval of the blowout well. As seen, the measured amplitudes do not agree exactly with the computed amplitudes but are very close. The data in FIG. 4 was computed assuming that the perforated or producing section of the blowout well was a point noise source.

Figure 5:
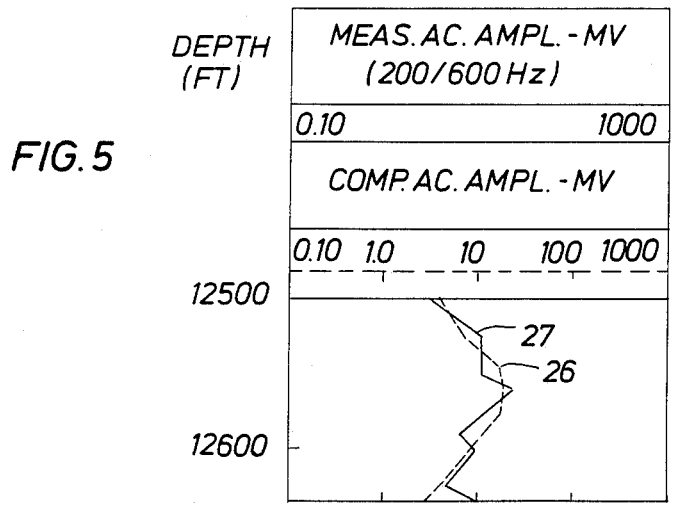

FIG. 5 illustrates the same producing interval assuming that each perforation was an individual source and by superposition. As seen, the general shape of the curve remains the same as in FIG. 4 and one could still predict the distance between the relief well and the blowout well within reasonable limits.

The above results could probably be improved if one removes the line source contribution in the power domain rather than as amplitude. This can readily be accomplished by squaring all amplitude measurements, performing the subtraction (background or line source subtracted from total observed signal) and then taking the square root thus leaving essentially a point source amplitude response curve with which the distance estimates can be made as discussed above.

It is obvious from the above description that the relief well can be positioned close enough with respect to a blowout zone in a well to permit killing the producing formation from the relief well. It is also possible to differentiate between formations which are contributing to the flow in the blowout well from formations that are not contributing when the blowout well contains more than one producing interval or formation. This situation often arises in offshore wells where for economy a single well is utilized to produce from two or more formations.

I claim:

1. A method for finding the distance to a blowout well from a relief well drilled to intercept a formation feeding said blowout well comprising:

first measuring the amplitude of acoustic energy in the relief well at a plurality of positions located at different depths including a position where the amplitude of acoustic energy in the relief well is a maximum;

second measuring the amplitude of background acoustic energy contributed by a line source in the relief well, subtracting said amplitude of said background acoustic energy from each of said first measurements of the amplitude of acoustic energy and plotting the difference with respect to depth at which each said first measurement was made to obtain corrected values of said first mentioned measured values of the amplitude of acoustic energy;

assuming a value for compressional wave velocity and absorption coefficient based on data available in the formation;

measuring a distance along the longitudinal axis of the relief well between at least two of said first mentioned measurements of the amplitude of acoustic energy, one of the at least two first mentioned measurements being the maximum first measurement obtained and is assumed to be a point in the relief well nearest to an assumed acoustic point source at the blowout well; and calculating a distance between the point in the relief well assumed nearest to the assumed acoustic point source at the blowout well and the assumed acoustic point source at the blowout well using said at least two of said corrected values of the amplitude of acoustic energy and said assumed values of compressional wave velocity and absorption coefficient.

2. The method of claim 1 wherein an acoustic velocity log is obtained in said relief well to determine the compressional wave velocity of the formation.

3. The method of claim 1 wherein noise from the formation feeding said blowout well is assumed to be a single point acoustical source in calculating said distance.

4. The method of claim 1 wherein said at least two of said first mentioned measurements are selected equal distances above and below the point of maximum observed amplitude of the acoustic noise in the relief well.

5. The method of claim 1 wherein a producing zone of said blowout well is assumed to be a multipoint acoustical source.

6. The method of claim 1 wherein said relief well has an angle of intercept with said blowout well of less than 10 degrees.

7. The method of claim 6 wherein said relief well is substantially straight as it approaches the formation feeding said blowout well.

8. The method of claim 1 wherein the calculated distance between the relief well and blowout well is determined from the expressions $$A_1 = \frac{A_o}{r_1} \overline{e}^{\alpha f r_1 / V};$$

$$A_2 = \frac{A_o}{r_2} \overline{e}^{\alpha f r_2 / V} \text{ and}$$

$$r_1 = (r_2^2 - d_{1,2}^2)^{\frac{1}{2}}$$

wherein $A_1$ and $A_2$ are the amplitude of acoustic energy measured at two locations at different depths in said relief well, $A_o$ is the amplitude of the assumed point acoustic source at the blowout well, $r_1$ and $r_2$ are the distances between the assumed point source in the blowout well and said at least two first measurement locations, $\alpha$ is the absorption coefficient, f is the frequency and V is the acoustic compressional wave velocity of the formation.

9. The method of claim 8 wherein a producing zone of said blowout well is assumed to be a multipoint acoustical source and said expressions are solved simultaneously in order to calculate the distance $r_1$ between the relief well and the blowout well for each point source in the multipoint acoustical source.

* * * * *